United States Patent
Singhal et al.

(10) Patent No.: US 11,836,049 B2
(45) Date of Patent: Dec. 5, 2023

(54) METHOD AND SYSTEM FOR PERFORMING A ROLLING BACKUP WITHIN A BACKUP WINDOW

(71) Applicant: Dell Products L.P., Round Rock, TX (US)

(72) Inventors: Upanshu Singhal, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 22 days.

(21) Appl. No.: 17/708,140

(22) Filed: Mar. 30, 2022

(65) Prior Publication Data

US 2023/0315578 A1 Oct. 5, 2023

(51) Int. Cl.
*G06F 11/14* (2006.01)
(52) U.S. Cl.
CPC ...... *G06F 11/1458* (2013.01); *G06F 11/1451* (2013.01)

(58) Field of Classification Search
CPC .......................... G06F 11/1458; G06F 11/1451
See application file for complete search history.

(56) References Cited

U.S. PATENT DOCUMENTS

| 2018/0181468 A1* | 6/2018 | Sharma | G06F 11/1461 |
| 2020/0319799 A1* | 10/2020 | Mayer | G06F 3/061 |
| 2021/0182154 A1* | 6/2021 | Liao | G06F 11/1469 |
| 2023/0058573 A1* | 2/2023 | Singh | G06F 3/04842 |

* cited by examiner

*Primary Examiner* — Mariela Reyes
*Assistant Examiner* — Courtney Harmon
(74) *Attorney, Agent, or Firm* — Chamberlain, Hrdlicka, White, Williams & Aughtry (57) ABSTRACT

A method for performing a backup includes: making a first determination that a last backup of assets is paused; obtaining, based on the first determination, a completed asset list and a non-completed asset list for the last backup; initiating a new backup for assets on the completed asset list for the last backup; and resuming backing up of assets on the non-completed asset list for the last backup.

20 Claims, 5 Drawing Sheets

METHOD AND SYSTEM FOR PERFORMING A ROLLING BACKUP WITHIN A BACKUP WINDOW

BACKGROUND

Computing devices may include any number of internal components such as processors, memory, and persistent storage. Computing resources associated with (e.g., used by) each of these internal components may be used to generate, store, and backup data. Such utilization of computing resources may affect the overall performance of the computing devices.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1 and 3.2 show a method for performing a backup in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a backup (e.g., a full backup, an incremental backup, etc.) may exceed a backup window (e.g., a period of time, with a definite start and end, within which the backup is set to be completed). Typically, as a result of a most-recently executed backup (e.g., a last backup) exceeding a backup window, a user of a computing device (e.g., a client) may experience performance degradation in production workloads (e.g., reading data from assets, writing data to the assets, etc.) because the data associated with the production workloads may still be in use by the last backup after the last backup has exceeded the backup window. The last backup may then need to be halted to prevent further impact on the production workloads. Embodiments of the invention relate to methods and systems for performing a backup within a backup window. More specifically, various embodiments of the invention may determine that a last backup of assets is paused. In response, a completed asset list and a non-completed asset list may be obtained for the last backup. A new backup for assets on the generated completed asset list may then be initiated (e.g., instantiated, executed, etc.). Finally, backup of the assets on the generated non-completed asset list may be resumed. This advantageously allows a currently active backup to be paused when it is determined that the currently active backup has exceeded its backup window. The paused backup will then be resumed (e.g., as a rolling backup) on its next backup schedule while a subsequent backup is initiated in parallel.

The following describes various embodiments of the invention.

Figure 1:
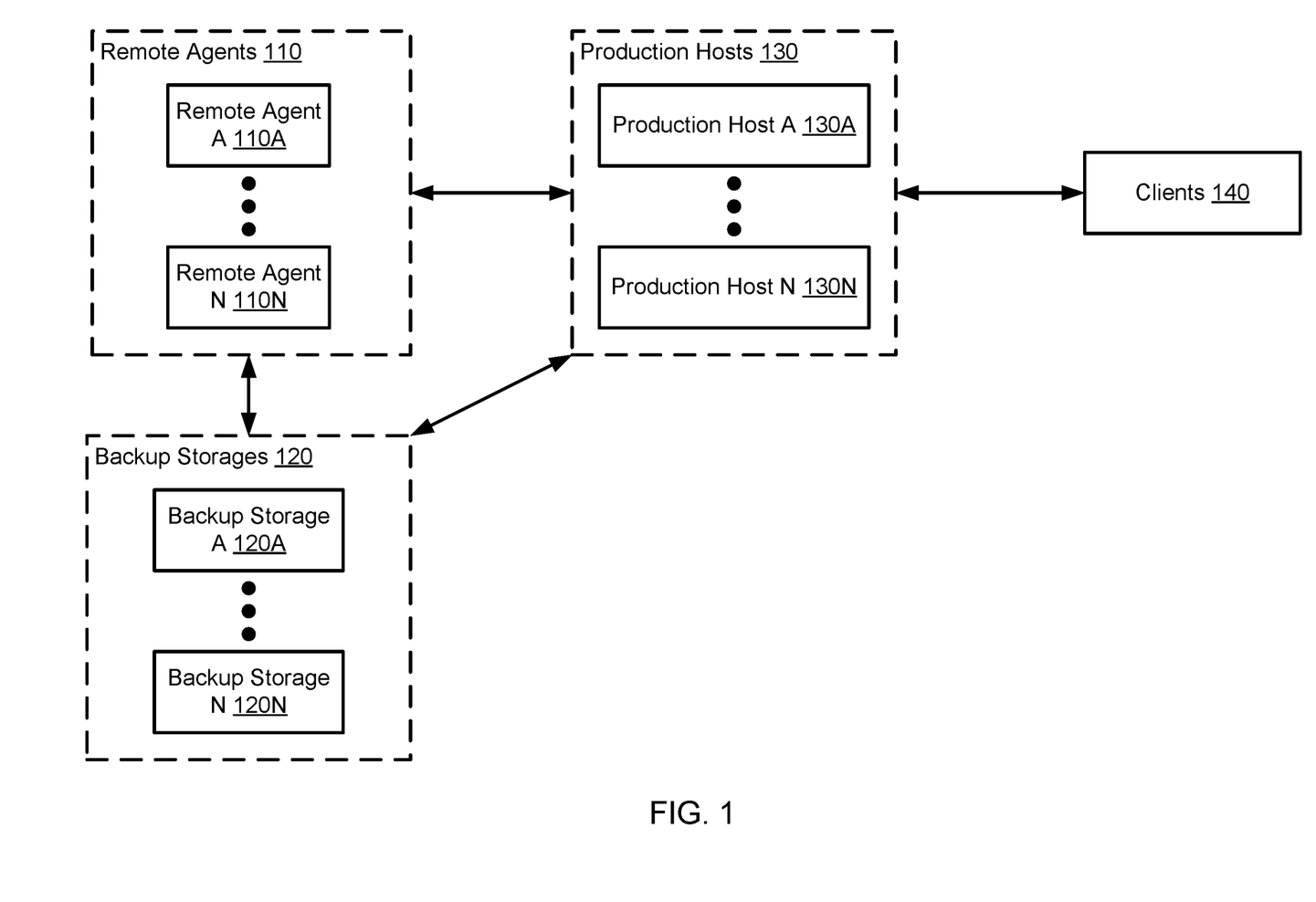
FIG. 1 shows a diagram of a system in accordance with one or more embodiments of the invention.

FIG. 1 shows a diagram of a system in accordance with one or more embodiments of the invention. The system includes remote agents (110), backup storages (120), productions hosts (130), and clients (140). The system may include additional, fewer, and/or different components without departing from scope of the invention. Each component may be operably connected to any of the other component via any combination of wired and/or wireless connections. Each component illustrated in FIG. 1 is discussed below.

In one or more embodiments of the invention, the remote agents (110) may provide backup services to the production hosts (130). The backup services may include generation and storage of backups in the backup storages (120). The backups services may also include restoration of the production hosts (130) using the backups stored in the backup storages (120).

More specifically, the remote agents (110) may provide backup services to the production hosts (130) by orchestrating: (i) generation of backups of the production hosts (130); (ii) storage of the generated backups of the production hosts (130) in the backup storages (120); (iii) consolidation of backup requests to reduce or prevent generation of backups that are not useful for restoration purposes; and (iv) restoration of the production hosts (130) to previous states using backups stored in the backup storages (120). The system may include any number of remote agents (e.g., 110A, 110N) without departing from the scope of the invention.

Additionally, to provide the aforementioned backup services, the remote agents (110) may include functionality to generate and issue instructions to any component of the system of FIG. 1. In one or more embodiments, the remote agents (110) may also generate instructions in response to backup requests from other entities.

In one or more embodiments of the invention, the remote agents (110) may generate such instructions in accordance with backup schedules that specify when backups are to be generated. In one or more embodiments, a backup schedule may lay out specific points in time for a backup process to be performed. Additionally, these backup schedules may be configured based on a user's recovery point objective (RPO), which is discussed below.

In one or more embodiments of the invention, the time between a data loss event and a most recent backup may be referred to herein as the "RPO." For example, if a user has a 4-hour RPO for an application (e.g., software), then the user will have a maximum 4-hour gap between the data loss event and the most recent backup. In some scenarios, having a 4-hour RPO may not necessarily mean the user will lose 4 hours' worth of data. For example, a word processing application may go down at 12:35 am and may be restored by 1:10 am. In this case, the user may not have much data to lose.

In another example, a security application may go down at 10:05 am and may not be restored until 1:25 pm. In this case, the user may lose highly valuable data. For this reason, the user may set the RPO depending on the application priority and may configure the backup schedules accordingly.

Figure 31:
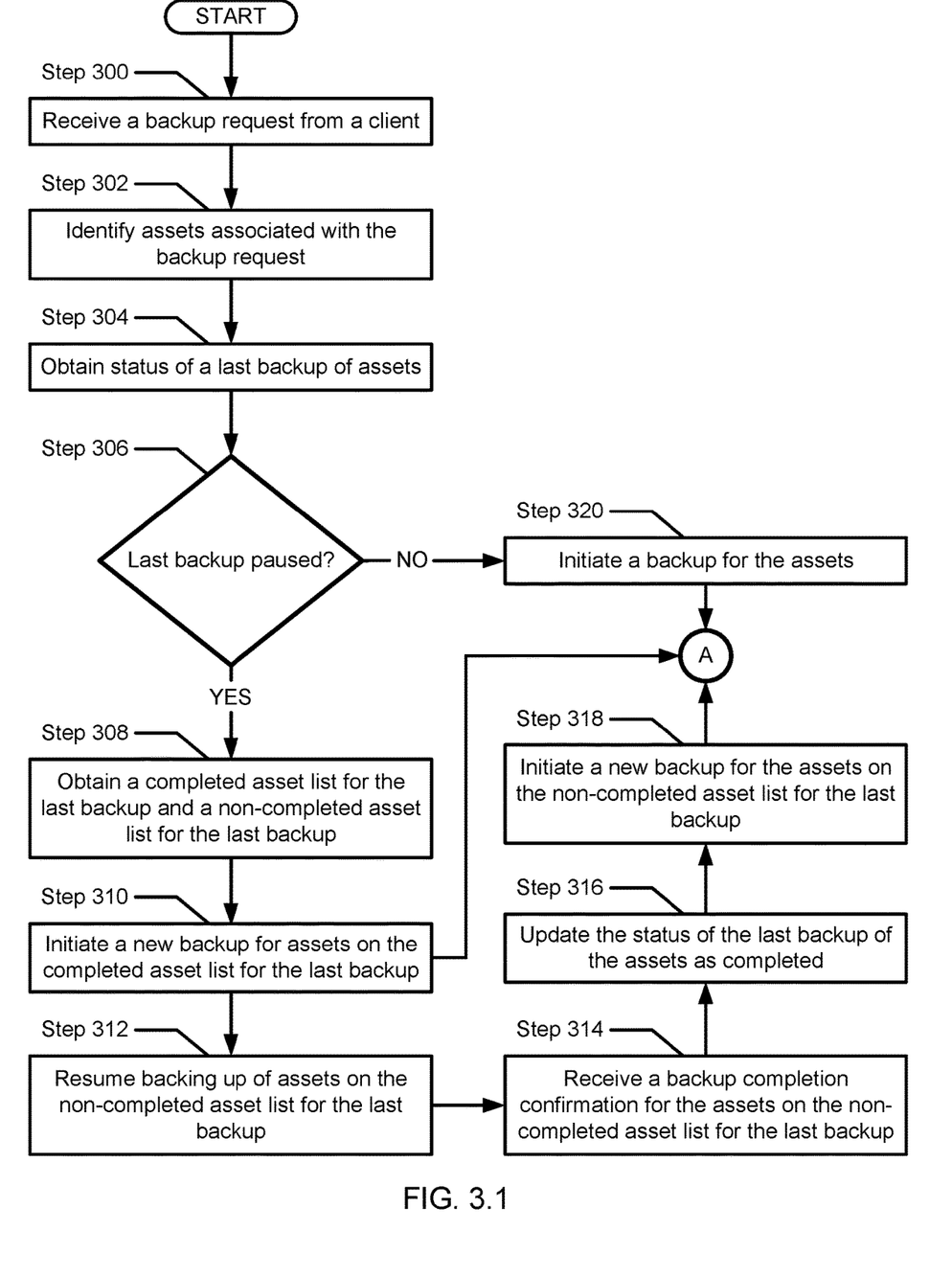
Figure 32:
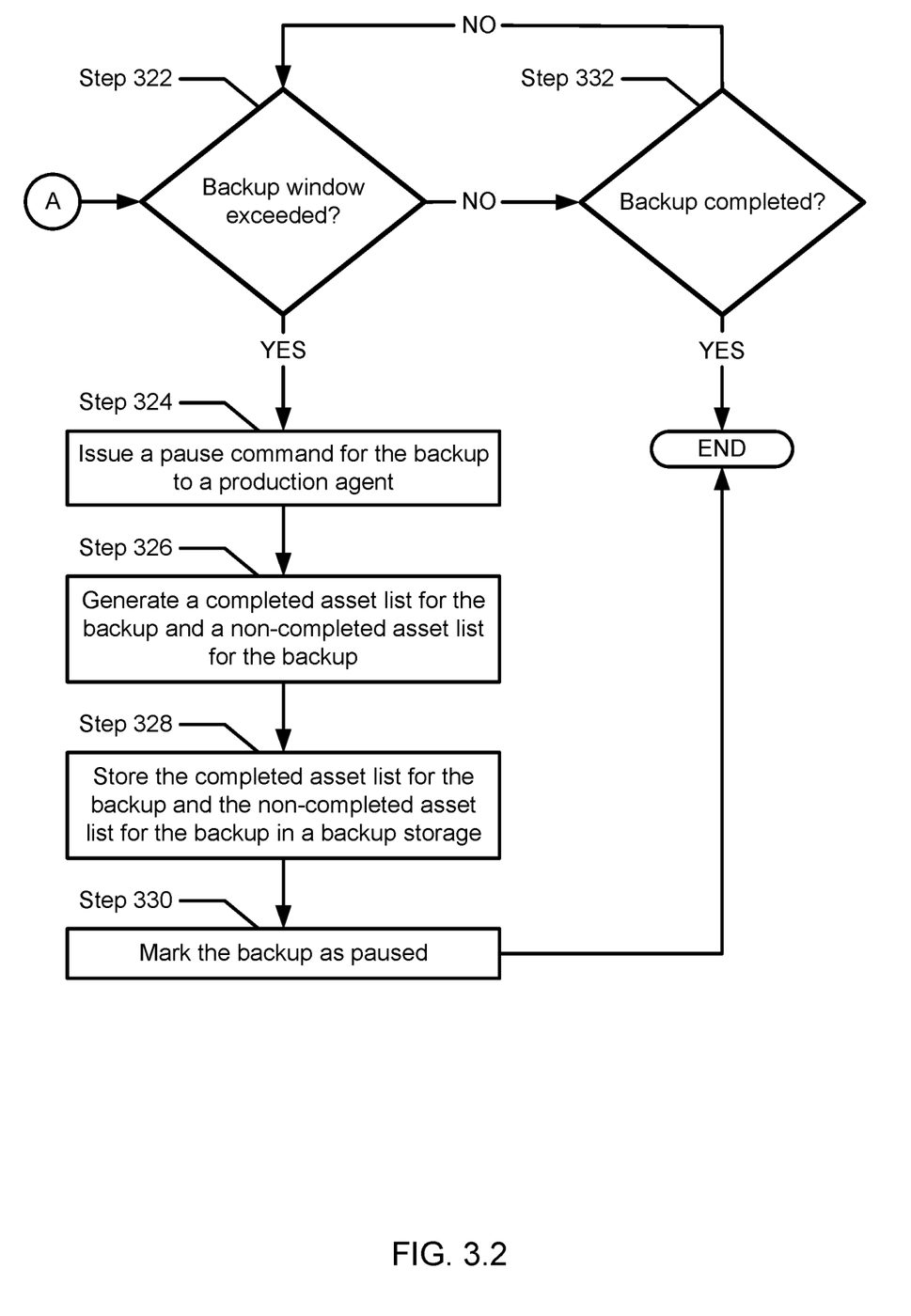

In one or more embodiments of the invention, to satisfy the above-discussed backup schedules, the remote agents (110) may monitor a backup window (e.g., 4 hours, 8 hours, etc.) to perform one or more backups. Additionally, the remote agents (110) may pause an ongoing backup if it is determined that the backup has exceeded a backup window allocated to the backup. The remote agents (110) may then resume the paused backup while performing a next backup in parallel with the resumed backup. Additional details regarding the backup process are described below in reference to FIGS. 3.1 and 3.2.

Figure 4:
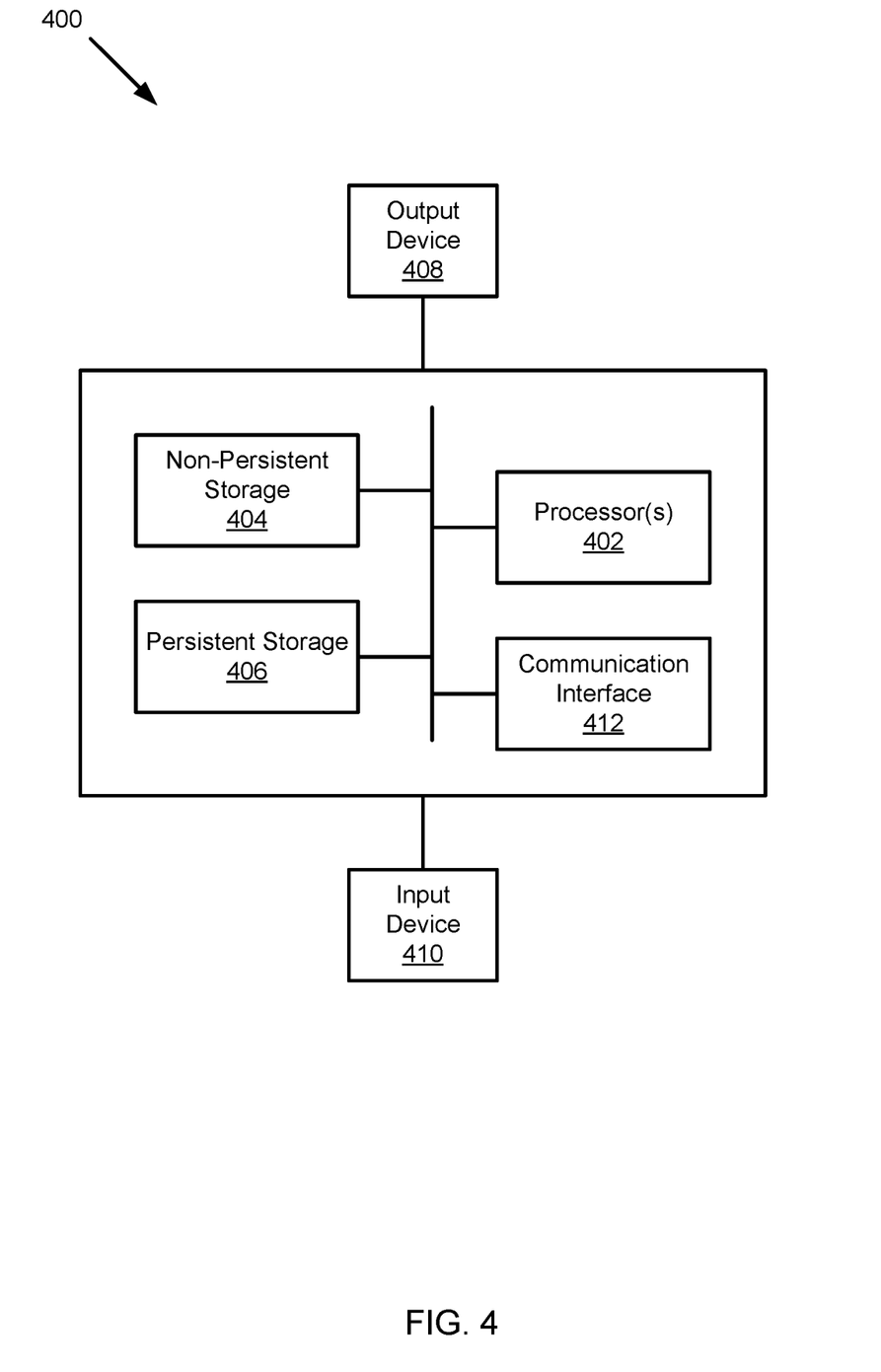
FIG. 4 shows a diagram of a computing device in accordance with one or more embodiments of the invention.

In one or more embodiments of the invention, the remote agents (110) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the remote agents (110) described throughout this application.

Alternatively, in one or more embodiments of the invention, the remote agents (110) may be implemented as logical devices. A logical device may utilize the computing resources of any number of computing devices to provide the functionality of the remote agents (110) described throughout this application.

In one or more embodiments of the invention, the backup storages (120) may provide data storage services. For example, the backup storages (120) may store backups of the production hosts (130). The backup storages (120) may also provide copies of previously stored backups of the production hosts (130). The system may include any number of backup storages (e.g., 120A, 120N) without departing from the scope of the invention.

In one or more embodiments of the invention, the backup storages (120) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the backup storages (120) described throughout this application.

Alternatively, in one or more embodiments of the invention, similar to the remote agents (110), the backup storages (120) may also be implemented as logical devices, as discussed above.

In one or more embodiments of the invention, the production hosts (130) may provide services to the clients (140). For example, the production hosts (130) may host any number of applications that provide application services to the clients (140). Application services may include, but are not limited to: database services, electronic communication services, instant messaging services, file storage services, etc.

In one or more embodiments of the invention, each of the production hosts (e.g., 130A, 130N) may provide the above-discussed application services by hosting applications. Each of the production hosts may host any number of applications. Additionally, different production hosts may host the same number of applications or different numbers of applications. Different production hosts may also host similar or different applications.

In one or more embodiments of the invention, the production hosts (130) may host virtual machines (VMs) that host the above-discussed applications. Each of the production hosts (130) may host any number of VMs that, in turn, host any number of applications.

In one or more embodiments of the invention, the production hosts (130) may perform portions of a backup process (also referred to herein simply as "backup" or "backups"). For example, the production hosts (130) may initiate backups under the direction of the remote agents (110). In one or more embodiments, the production hosts (130) may include functionality to consolidate multiple backup generation requests so that duplicative backups (which may not be useful for restoration purposes) are not generated.

In one or more embodiments of the invention, the production hosts (130) may include functionality to initiate multiple backups in parallel. For example, the production hosts (130) may each host multiple backup processes that each manages the initiation of a respective backup. Each of the multiple backup processes may operate concurrently thereby causing multiple backups to be initiated in parallel.

In one or more embodiments of the invention, the production hosts (130) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the production hosts (130) described throughout this application.

Alternatively, in one or more embodiments of the invention, similar to the remote agents (110), the production hosts (130) may also be implemented as logical devices, as discussed above.

In one or more embodiments of the invention, the clients (140) may interact with the production hosts (130). For example, the clients (140) may utilize application services provided by the production hosts (130). When the clients (140) interact with the production hosts (130), data that is relevant to the clients (140) may be stored on the production hosts (130). For example, consider a scenario in which the production hosts (130) host a database utilized by the clients (140). In this scenario, the database may be a user database associated with the users of the clients (140). When a new user is identified, the clients (140) may add information regarding the new user to the database. By doing so, the data that is relevant to the clients (140) may be stored in the production hosts (130). This may be done because the clients (140) may desire access to the data regarding the new user at some point in time.

In one or more embodiments of the invention, the clients (140) may include functionality to use services provided by the production hosts (130). For example, the clients (140) may host local applications that interact with applications hosted by the production hosts (130).

In one or more embodiments of the invention, the clients (140) may be implemented as computing devices (e.g., 400, FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device, cause the computing device to perform the functionality of the clients (140) described throughout this application.

Alternatively, in one or more embodiments of the invention, similar to the remote agents (110), the clients (140) may also be implemented as logical devices, as discussed above.

Figure 2:
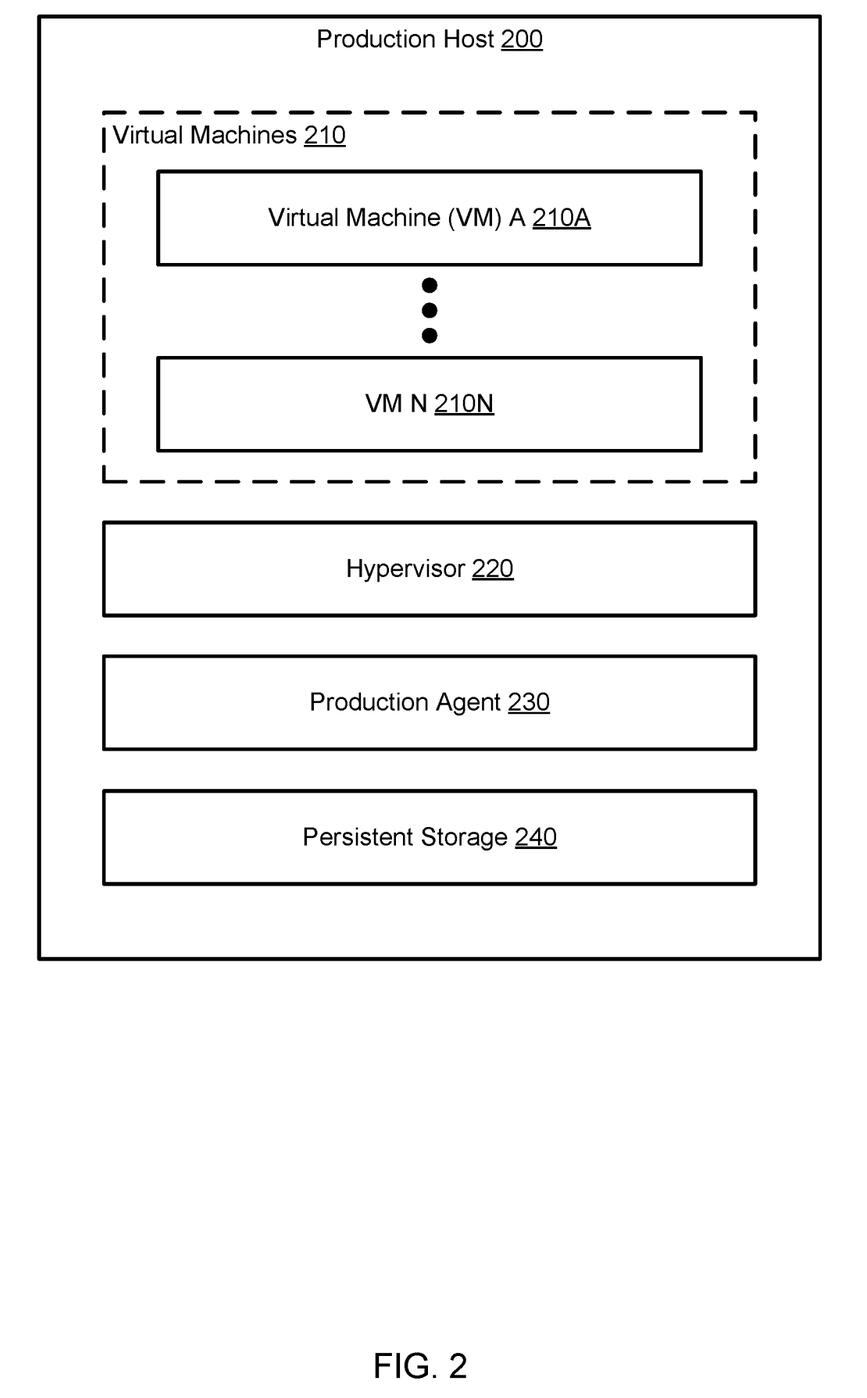
FIG. 2 shows a diagram of a production host in accordance with one or more embodiments of the invention.

Turning now to FIG. 2, FIG. 2 shows a diagram of a production host in accordance with one or more embodiments of the invention. The production host (200) may be any one of the production hosts (130) discussed above in reference to FIG. 1. The production host (200) may include VMs (210), a hypervisor (220), a production agent (230), and persistent storage (240). The production host may include additional, fewer, and/or different components without departing from scope of the invention. Each component may be operably connected to any of the other component via any combination of wired and/or wireless connections. Each component illustrated in FIG. 2 is discussed below.

In one or more embodiments of the invention, the VMs (210) may be logical entities executed using computing resources of the production host (200) or using computing resources of other computing devices (e.g., mobile phones, tablet computers, laptop computers, desktop computers, servers, distributed computing systems, cloud resources, etc.) connected to the production host. Each of the VMs (e.g., 210A, 210N) may be performing similar or different processes.

In one or more embodiments, the VMs (210) (and applications hosted by the VMs) may generate data (e.g., VM data) that is stored in the persistent storage (240). In one or more embodiments, the VM data may reflect the state of a VM (210).

In one or more embodiments of the invention, the VMs (210) may provide services to the clients (e.g., 140, FIG. 1). For example, the VMs (210) may host instances of databases, email servers, or other applications that are accessible to the clients. The VMs (210) may host other types of applications not listed above without departing from the scope of the invention. Additionally, the applications hosted by the VMs (210) may provide application services to the clients (e.g., 140, FIG. 1).

In one or more of embodiments of the invention, the VMs (210) may be implemented as computer instructions, e.g., computer code, stored on the persistent storage (240) that when executed by a processor of the production host (200) cause the production host (200) to provide the functionality of the VMs (210) described throughout the application.

In one or more embodiments of the invention, the hypervisor (220) may be configured to orchestrate the operation of the VMs (210) by allocating computing resources (e.g., CPU, memory, etc.) to each of the VMs (210).

In one or more embodiments of the invention, the hypervisor (220) may be a physical device including circuitry. The physical device may be, but it is not limited to: a field-programmable gate array (FPGA), an application-specific integrated circuit, a programmable processor, a microcontroller, a digital signal processor, etc. The physical device may be adapted to provide the functionality of the hypervisor (220) described throughout this application.

Alternatively, in one or more of embodiments of the invention, the hypervisor (220) may be implemented as computer instructions, e.g., computer code, stored on the persistent storage (240) that when executed by a processor of the production host (200) cause the production host (200) to provide the functionality of the hypervisor (220) described throughout the application.

In one or more embodiments of the invention, the production agent (230) may be configured to locally orchestrate the performance of backup services for the VMs (210). More specifically, the production agent (230) may orchestrate the performance of the backup services under the direction of the remote agents (e.g., 110, FIG. 1). For example, the remote agents may send instructions to the production agent (230) regarding: (i) when one or more backups of the VMs (210) should be generated; (ii) where the generated backup(s) should be stored; and (iii) when a VM should be restored to a previous state. Other instructions not listed above may also be sent without departing from the scope of the invention.

To orchestrate the performance of the backup services, the production agent (230) may issue commands to the hypervisor (220) to control the operation of the VMs (210) when a backup of one of the VMs (210) is being generated, or when a restoration of one of the VMs (210) is being performed.

In one or more embodiments of the invention, the production agent (230) may be a hardened entity, i.e., not modifiable by an entity that is remote to the production host (200) on which the production agent (230) is executing. In one or more embodiments, the production agent (230) may have a set of predefined functions that may be invoked by a remote entity. In one or more embodiments, the production agent (230) may not be configurable by modifying settings or associated configuration files by the remote entity.

In one or more embodiments of the invention, the production agent (230) may be implemented as computer instructions, e.g., computer code, stored on the persistent storage (240) that when executed by a processor of the production host (200) cause the production host (200) to provide the functionality of the production agent (230) described throughout the application.

Alternatively, in one or more embodiments of the invention, similar to the hypervisor (220), the production agent (230) may also be a physical device including circuitry, as discussed above.

In one or more embodiments of the invention, the persistent storage (240) may be a physical computer readable storage medium. For example, the persistent storage (240) may be (or may include) hard disk drives, solid-state drives, tape drives, or other physical storage media. The persistent storage (240) may be other types of digital storage not listed above without departing from the scope of the invention. Additionally, the persistent storage (240) may be a virtualized storage without departing from the scope of the invention.

FIGS. 3.1 and 3.2 show a method for performing a backup in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3.1, the method shown in FIG. 3.1 may be performed by, for example, the remote agents (e.g., 110, FIG. 1). Other components of the system illustrated in FIG. 1 may also contribute to the performance of the method shown in FIG. 3.1 without departing from the scope of the invention.

In Step 300, a backup request from a client is received. The backup request may include a request for backing up one or more of the VMs (e.g., 210, FIG. 2). In one or more embodiments of the invention, the backup request may be initiated by a user of one or more of the clients (e.g., 140, FIG. 1).

In one or more embodiments of the invention, the backup request may be received in the form of a scheduled job, an on-demand instruction, or in any other form that initiates a backup. In one or more embodiments, the scheduled job may be part of the backup schedule discussed above in reference to FIG. 1. For example, the backup schedule may specify an incremental backup (e.g., a backup type that only backups data that has been changed since the last backup) is to be performed twice a day at noon and midnight based on information provided in the scheduled job.

In one or more embodiments of the invention, the on-demand instruction may specify an instruction for performing an unscheduled backup. For example, the user may need to initiate an urgent backup at a time other than when one or more backups are originally scheduled. In this scenario, the user may send the on-demand instruction to initiate the urgent backup.

In one or more embodiments of the invention, the backup request may specify one or more VM identifiers (not shown). Each of the VM identifiers may correspond to a respective VM to be backed up. In one or more embodiments, each VM identifier may identify a unique VM.

In one or more embodiments of the invention, the backup request may further specify an order in which backups of VMs are to be generated. The VM identifiers may be organized based on the specified order. In one or more embodiments, the remote agents may identify a VM specified by a first VM identifier and may request to initiate a backup of the corresponding VM from the production agent (e.g., 230, FIG. 2). The remote agents may then identify a second VM specified by a second VM identifier (listed after the first VM identifier in the specified order) and may request to initiate a backup of the corresponding VM. The remote agents may repeat this process until all VMs specified by the VM identifiers are backed up.

In one or more embodiments of the invention, each VM may be backed up concurrently (e.g., may be backed up in parallel). In other words, the production agent (e.g., 230, FIG. 2) may perform more than one backup of VMs at the same time based on the information specified in the backup request (e.g., initiate backups of VM A (e.g., 210A, FIG. 2) and VM N (e.g., 210N, FIG. 2) concurrently). By doing so, multiple backups may be initiated in parallel.

In Step 302, assets associated with the backup request are identified.

In one or more embodiments of the invention, an asset may represent a database (or any logical container) to and from which related digital data (or any granularity thereof) may be stored and retrieved, respectively. The asset may occupy a portion of a physical storage device (e.g., 240, FIG. 2) or, alternatively, may span across multiple physical storage devices. Additionally, the asset may refer to a composite of various database objects including, but not limited to: one or more recovery catalogs, one or more data files, one or more control files, one or more archive log files, etc. Each of these database objects is described below.

In one or more embodiments of the invention, a recovery catalog may refer to a database object that stores metadata of the backup process (also referred to herein as "backup metadata"). The recovery catalog may include entries for one or more backup processes. The entries may include backup metadata that specify information regarding successfully backed-up data files for the backup process. For example, the backup metadata may include, but is not limited to: data file identifiers, data file storage locations, etc.

In one or more embodiments of the invention, a data file may refer to a database object that stores database data. The database data may include computer readable content (e.g., text, image, video, audio, machine code, any other form of computer readable content, or a combination thereof) that may be generated, interpreted, and/or processed by an application.

In one or more embodiments of the invention, the application may refer to a computer program that is executed on the client. More specifically, the application may be designed and configured to perform one or more operations (e.g., functions, tasks, activities) instantiated by the user of the client. Examples of the user application may include, but are not limited to: a word processor, a media player, a web browser, a file viewer, an image editor, etc.

In one or more embodiments of the invention, while performing these operations, the application may include functionality to request and use a client's resources (e.g., processors, memory, network bandwidth, etc.). The application may perform other types of functionalities not listed above without departing from the scope of the invention.

In one or more embodiments of the invention, the data file may store database data in: (i) an undeduplicated form; or (ii) a deduplicated form. Briefly, the deduplicated form of the database data may be generated through the application of data deduplication on the undeduplicated form of the database data. That is, undeduplicated database data may include computer readable content that may or may not entail redundant information. In contrast, deduplicated database data may result from the elimination of any redundant information analyzed throughout an undeduplicated computer readable content.

In one or more embodiments of the invention, the deduplication database may reflect a content recipe of the undeduplicated computer readable content. A content recipe may be a sequence of chunk identifiers (or pointers) associated with (or directed to) unique database data chunks consolidated in the physical storage. The sequence of chunk identifiers (as a representative of the deduplicated database data) may be used to reconstruct the corresponding undeduplicated database data. Additionally, a given chunk identifier for a given database data chunk may include a cryptographic fingerprint or hash of the given database data chunk.

In one or more embodiments of the invention, a control file may refer to a database object that stores an asset metadata (also referred to as database metadata). The database metadata may include information descriptive of the database (or the asset) status and structure. The database metadata may include, but are not limited to: a database name assigned to the asset, the name(s) and storage location(s) of one or more data files, a creation timestamp encoding the data and/or time marking the creation of the asset, a log sequence number associated with a current archive log file, etc.

In one or more embodiments of the invention, an archive log file may refer to a database object that stores the history of changes made to the database data. The archive log file may include one or more redo entries (or redo records), which may include a set of change vectors. Each change vector may describe (or represent) a modification made to a subset of an asset (e.g., a single data block associated with the archive log file). In one or more embodiments, the archive log file may serve to recover the asset should a failover occur, or to apply recent changes to a recovered asset, which may have occurred during the backup process.

In one or more embodiments of the invention, the asset may be a part of a storage array (e.g., a network attached storage array). In one or more embodiments, the storage array may refer to a collection of one or more physical storage devices, in which various forms of digital data (e.g., assets) may be consolidated. Each physical storage device may include non-transitory computer readable storage media, in which the asset may be stored in whole or in part, and temporarily or permanently.

In one or more embodiments of the invention, each physical storage device may be designed and configured based on a common or different storage technology—examples of which may include, but are not limited to: flash based storage devices, fibre-channel (FC) based storage devices, serial advanced technology attachment (SATA) storage devices, etc.

In one or more embodiments of the invention, any subset of (or all of) the storage array may be implemented using persistent (i.e., non-volatile) storage. Examples of persistent storage may include, but are not limited to: optical storage, magnetic random access memory (M-RAM), spin torque magnetic RAM (ST-MRAM), phase-change memory (PCM), etc.

In Step 304, status of a last backup of the assets is obtained.

In one or more embodiments of the invention, the status of the last backup may specify information such as, but is not limited: (i) whether the last backup was successful and whether the last backup was completed within a defined backup window (e.g., 100% of the last backup was completed); or (ii) whether the last backup was unsuccessful and how much of the last backup was not completed within the backup window (e.g., 60% of the last backup was completed and 40% of the last backup was not completed).

In one or more embodiments of the invention, the backup storages (e.g., 120, FIG. 1) may include a backup file monitoring service (not shown) for monitoring the status of the last backup. The backup file monitoring service may represent a computer program that may execute on the underlying hardware of the backup storages. Specifically, the backup file monitoring service may be designed and configured to facilitate remote access for status check and manipulation of locally stored assets during the last backup. Further, the backup file monitoring service may include functionality to control remote procedure calls directed to accessing and manipulating any granularity of the locally stored assets during the last backup.

In Step 306, a first determination is performed to determine whether the last backup was paused. If the result of the first determination is YES, the remote agents determine that the last backup was paused and the method proceeds to Step 308. If the result of the first determination is NO, the remote agents determine that the last backup was not paused and the method proceeds to Step 320.

In Step 308, a completed asset list and a non-completed asset list are obtained for the last backup.

In one or more embodiments of the invention, it is determined in Step 306 that the last backup was unsuccessful. As a result, the last backup is paused, and a completed asset list specifying assets associated with the completed 60% of the last backup and a non-completed asset list specifying assets associated with the non-completed 40% of the last backup are obtained.

In one or more embodiments of the invention, the completed asset list may include, but it is not limited to: the VM identifiers associated with the VMs that are backed up, the names of one or more database objects (e.g., the recovery catalogs, the data files, the control files, etc.) that are backed up, the backup schedule information, the backup window information, etc.

In one or more embodiments of the invention, the non-completed asset list may include, but it is not limited to: the VM identifiers associated with the VMs that are not backed up, the names of one or more database objects (e.g., the recovery catalogs, the data files, the control files, etc.) that are not backed up, the backup schedule information, the backup window information, the amount of time that the last backup exceed over the backup window, etc.

In Step 310, a new backup for assets specified by the generated completed asset list is initiated.

Continuing with the example discussed above in Step 308, a new backup for the completed 60% of the last backup may be initiated. In one or more embodiments, after Step 310 is completed, the method proceeds to execute Step 312 and Step 322 in parallel.

In Step 312, backing up of assets specified by the generated non-completed asset list is resumed.

Continuing with the example discussed above in Step 308, while the new backup for the assets specified by the generated completed asset list is running, the backing up of the non-completed 40% of the last backup may be resumed in parallel.

In Step 314, a backup completion confirmation for the assets specified by the generated non-completed asset list is received. In one or more embodiments of the invention, the production agent (e.g., 230, FIG. 2) may send the backup completion confirmation to the remote agents.

In Step 316, the status of the last backup of the assets is updated as completed.

In one or more embodiments of the invention, upon completion of the backup of the assets specified by the generated non-completed asset list, the status of the last backup may be updated as completed. This completed status may be presented to a user on a display via a graphical user interface (GUI).

In one or more embodiments of the invention, the GUI may be displayed on a display of the computing device (e.g., 400, FIG. 4) using functionalities of a display engine (not shown), in which the display engine is operatively connected to the computing device. The display engine may be implemented using hardware, software, or any combination thereof. The status update may be displayed in any visual format that would allow the user to easily comprehend (e.g., read and parse) the listed information.

In Step 318, a new backup for the assets specified by the generated non-completed asset list is initiated.

Continuing with the example discussed above in Step 308, while the new backup for assets specified by the generated completed asset list is running (e.g., being executed), a new backup for the non-completed 40% of the last backup may be initiated in parallel. Then, the method proceeds to Step 322.

In Step 320, a backup for the assets associated with the backup request is initiated.

In one or more embodiments of the invention, because the last backup was completed within the backup window (e.g., 100% of the last backup was completed), the backup for the assets is initiated as a next cycle in the backup process. Then, the method proceeds to Step 322.

Turning now to FIG. 3.2, the method shown in FIG. 3.2 may be performed by, for example, the remote agents (e.g., 110, FIG. 1). Other components of the system illustrated in FIG. 1 may also contribute to the performance of the method shown in FIG. 3.2 without departing from the scope of the invention.

Additionally, the method shown in FIG. 3.2 may be performed on a per-backup basis. More specifically, the method shown in FIG. 3.2 may be performed for each backup that is initiated in Step 310, Step 318, and Step 320.

In Step 322, a second determination is performed to determine whether the execution time of the last backup has exceeded the backup window. If the result of the second determination is YES, the method proceeds to Step 324. If the result of the second determination is NO, the method proceeds to Step 332.

In Step 324, a pause command for the backup is issued to the production agent (e.g., 230, FIG. 2).

In one or more embodiments of the invention, if the method proceeds to Step 322 from Step 320, the backup in Step 324 is the same backup discussed above in Step 320. Alternatively, in the event that the method proceeds to Step 322 from Step 318 or Step 310, the backup discussed in Step 324 is the new backup discussed above in Step 318 or Step 310.

In one or more embodiments of the invention, the remote agents may issue the pause command to halt the backup. If more than one VM is involved in the backup (sequentially or concurrently), the pause command may need to be issued to all of the VMs involved with the backup.

In one or more embodiments of the invention, after halting the backup, the production agent (e.g., 230, FIG. 2) may temporarily disable the hypervisor (e.g., 220, FIG. 2) and may take a snapshot (e.g., a point-in-time copy of data) of the completed part(s) of the backup. The production agent may store the snapshot locally in the persistent storage (e.g., 240, FIG. 1) as an indication of where the backup was halted. In one or more embodiment, the production agent may then allow the operation of the hypervisor to continue and may send a notification about the performed snapshot process (e.g., "the snapshot was taken successfully" or "the snapshot was not taken") to the remote agents.

In one or more embodiments of the invention, after halting the backup, the production agent (e.g., 230, FIG. 2) may send a request to the backup storages (e.g., 120, FIG. 1) to not delete the completed part(s) of the backup. Continuing with the example discussed above in Step 308, the production agent may request that the backup storages not delete the assets associated with the completed 60% of the last backup.

In one or more embodiments of the invention, the pause command discussed above in Step 324 may disable the backup of the non-completed part(s) until a new backup is initiated (e.g., started) for the completed part(s). Continuing with the example discussed above in Step 308, the remote agents may not allow the production agent (e.g., 230, FIG. 2) to resume backing up of the non-completed 40% of the last backup until a new backup for the completed 60% of the last backup is initiated. In one or more embodiments, the pause command may also halt processing of any additional backup requests associated with the paused backup received from the client.

In Step 326, a completed asset list and a non-completed asset list are generated for the backup.

In one or more embodiments of the invention, the remote agents may request the generation of the completed asset list and the non-completed asset list from the production agent (e.g., 230, FIG. 2).

In Step 328, the generated completed asset list and the generated non-completed asset list are stored in a backup storage (e.g., 120A, 120N, FIG. 1). In one or more embodiments, the generated completed asset list and the generated non-completed asset list may also be stored locally on the persistent storage (e.g., 240, FIG. 2).

In Step 330, the backup is marked as paused.

In one or more embodiments of the invention, the backup may be marked as paused on the GUI. In one or more embodiments, the user may then be notified about the status of the backup (e.g., paused) via the GUI.

In one or more embodiments of the invention, the method ends following Step 330.

In Step 332, a third determination is performed to determine whether the backup was completed. If the result of the third determination is YES, the method ends. If the result of the third determination is NO, the method returns to Step 322.

The embodiments shown in FIGS. 3.1 and 3.2 advantageously allow users to pause backups that have exceeded their backup windows, and complete the paused backups in parallel with one or more subsequently scheduled backups within a backup window allotted for the subsequently scheduled backups. Because the paused backup is completed in parallel with the subsequently scheduled backup, a gap between the two backups can advantageously be eliminated. This also advantageously allows users to pause a backup on an ad-hoc basis, for example, in the event of an environmental hazard in a data center (e.g., fire, high humidity, etc.). The user may then resume the paused backup while initiating other backups in parallel after the environmental hazard has been resolved.

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as RAM, cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN), such as the Internet, mobile network, or any other type of network) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing a backup, the method comprising:
receiving a backup request from a client to back up a virtual machine (VM),
wherein the backup request is initiated by a user of the client,
wherein the backup request specifies at least a VM identifier associated with the VM and a VM identifier-based order that shows when the VM needs to be backed up,
wherein the backup request is received in a form of a scheduled job,
wherein the scheduled job is a part of a backup schedule to perform the backup;
identifying assets associated with the backup request,
wherein the assets comprise at least one selected from a group consisting of recovery catalogs (RCs), control files (CFs), and archive log files;
making a first determination that a status of a last backup of the assets shows that the last backup of the assets was paused,
wherein the status of the last backup further shows that the last backup was unsuccessful and the last backup not completed within a predetermined backup window (PBW);
obtaining, based on the first determination, a completed asset list (CAL) for the last backup and a non-completed asset list (NCAL) for the last backup,
wherein the CAL specifies at least one selected from a group consisting of a plurality of VM identifiers associated with a plurality of backed up VMs, an identifier of a backed up RC, an identifier of a backed up CF, information associated with a backup schedule, and information associated with the PBW;
initiating a new backup for assets on the CAL for the last backup;
resuming backing up of assets on the NCAL for the last backup,
receiving a backup completion confirmation for the assets on the NCAL for the last backup; and
updating the status of the last backup of the assets as completed, wherein the completed status of the last backup is presented to the user via a graphical user interface (GUI).

2. The method of claim 1, further comprising:
initiating, after receiving the backup completion confirmation, a new backup for the assets on the NCAL for the last backup.

3. The method of claim 2, further comprising:
making a second determination that a backup window of the new backup for the assets on the NCAL is exceeded; and
issuing, based on the second determination, a pause command for the new backup for the assets on the NCAL, wherein the pause command halts the generation of the new backup for the assets on the NCAL.

4. The method of claim 2, further comprising:
after updating the status of the last backup of the assets as completed, initiating the new backup for the assets on the NCAL for the last backup.

5. The method of claim 1, further comprising:
making a second determination that a backup window of the new backup is exceeded; and
issuing, based on the second determination, a pause command for the new backup, wherein the pause command halts the generation of the new backup.

6. The method of claim 5, wherein the pause command is issued to a production agent on a production host, wherein the assets are stored on the production host.

7. The method of claim 5, wherein a status of the new backup is set to paused in response to the pause command being issued.

8. A non-transitory computer readable medium comprising computer readable program code, which when executed by a computer processor enables the computer processor to perform a method for performing a backup, the method comprising:
receiving a backup request from a client to back up a virtual machine (VM),
wherein the backup request is initiated by a user of the client,
wherein the backup request specifies at least a VM identifier associated with the VM and a VM identifier-based order that shows when the VM needs to be backed up,
wherein the backup request is received in a form of a scheduled job,
wherein the scheduled job is a part of a backup schedule to perform the backup;
identifying assets associated with the backup request,
wherein the assets comprise at least one selected from a group consisting of recovery catalogs (RCs), control files (CFs), and archive log files;
making a first determination that a status of a last backup of the assets shows that the last backup of the assets was paused,
wherein the status of the last backup further shows that the last backup was unsuccessful and the last backup not completed within a predetermined backup window (PBW);
obtaining, based on the first determination, a completed asset list (CAL) for the last backup and a non-completed asset list (NCAL) for the last backup,
wherein the CAL specifies at least one selected from a group consisting of a plurality of VM identifiers associated with a plurality of backed up VMs, an identifier of a backed up RC, an identifier of a backed up CF, information associated with a backup schedule, and information associated with the PBW;
initiating a new backup for assets on the CAL for the last backup;
resuming backing up of assets on the NCAL for the last backup,
receiving a backup completion confirmation for the assets on the NCAL for the last backup; and
updating the status of the last backup of the assets as completed, wherein the completed status of the last backup is presented to the user via a graphical user interface (GUI).

9. The non-transitory computer readable medium of claim 8, further comprising:
initiating, after receiving the backup completion confirmation, a new backup for the assets on the NCAL for the last backup.

10. The non-transitory computer readable medium of claim 9, further comprising:
making a second determination that a backup window of the new backup for the assets on the NCAL is exceeded; and
issuing, based on the second determination, a pause command for the new backup for the assets on the NCAL, wherein the pause command halts the generation of the new backup for the assets on the NCAL.

11. The non-transitory computer readable medium of claim 9, further comprising:
after updating the status of the last backup of the assets as completed, initiating the new backup for the assets on the NCAL for the last backup.

12. The non-transitory computer readable medium of claim 8, further comprising:
making a second determination that a backup window of the new backup is exceeded; and
issuing, based on the second determination, a pause command for the new backup, wherein the pause command halts the generation of the new backup.

13. The non-transitory computer readable medium of claim 12, wherein the pause command is issued to a production agent on a production host, wherein the assets are stored on the production host.

14. The non-transitory computer readable medium of claim 12, wherein a status of the new backup is set to paused in response to the pause command being issued.

15. A system for performing a backup, the system comprising:
a processor comprising circuitry;
memory comprising instructions, which when executed perform a method, the method comprising:
receiving a backup request from a client to back up a virtual machine (VM),
wherein the backup request is initiated by a user of the client,
wherein the backup request specifies at least a VM identifier associated with the VM and a VM identifier-based order that shows when the VM needs to be backed up,
wherein the backup request is received in a form of a scheduled job,
wherein the scheduled job is a part of a backup schedule to perform the backup;
identifying assets associated with the backup request,
wherein the assets comprise at least one selected from a group consisting of recovery catalogs (RCs), control files (CFs), and archive log files;
making a first determination that a status of a last backup of the assets shows that the last backup of the assets was paused,
wherein the status of the last backup further shows that the last backup was unsuccessful and the last backup not completed within a predetermined backup window (PBW);
obtaining, based on the first determination, a completed asset list (CAL) for the last backup and a non-completed asset list (NCAL) for the last backup,
wherein the CAL specifies at least one selected from a group consisting of a plurality of VM identifiers associated with a plurality of backed up VMs, an identifier of a backed up RC, an identifier of a backed up CF, information associated with a backup schedule, and information associated with the PBW;

initiating a new backup for the assets on the CAL for the last backup;

resuming backing up of assets on the NCAL for the last backup, receiving a backup completion confirmation for the assets on the NCAL for the last backup; and updating the status of the last backup of the assets as completed, wherein the completed status of the last backup is presented to the user via a graphical user interface (GUI).

16. The system of claim 15, further comprising:

initiating, after receiving the backup completion confirmation, a new backup for the assets on the NCAL for the last backup.

17. The system of claim 16, further comprising:

making a second determination that a backup window of the new backup for the assets on the NCAL is exceeded; and issuing, based on the second determination, a pause command for the new backup for the assets on the NCAL, wherein the pause command halts the generation of the new backup for the assets on the NCAL.

18. The system of claim 16, further comprising:

after updating the status of the last backup of the assets as completed, initiating the new backup for the assets on the NCAL for the last backup.

19. The system of claim 15, further comprising:

making a second determination that a backup window of the new backup is exceeded; and issuing, based on the second determination, a pause command for the new backup, wherein the pause command halts the generation of the new backup.

20. The system of claim 19, wherein the pause command is issued to a production agent on a production host, wherein the assets are stored on the production host.

* * * * *